Patented May 21, 1940

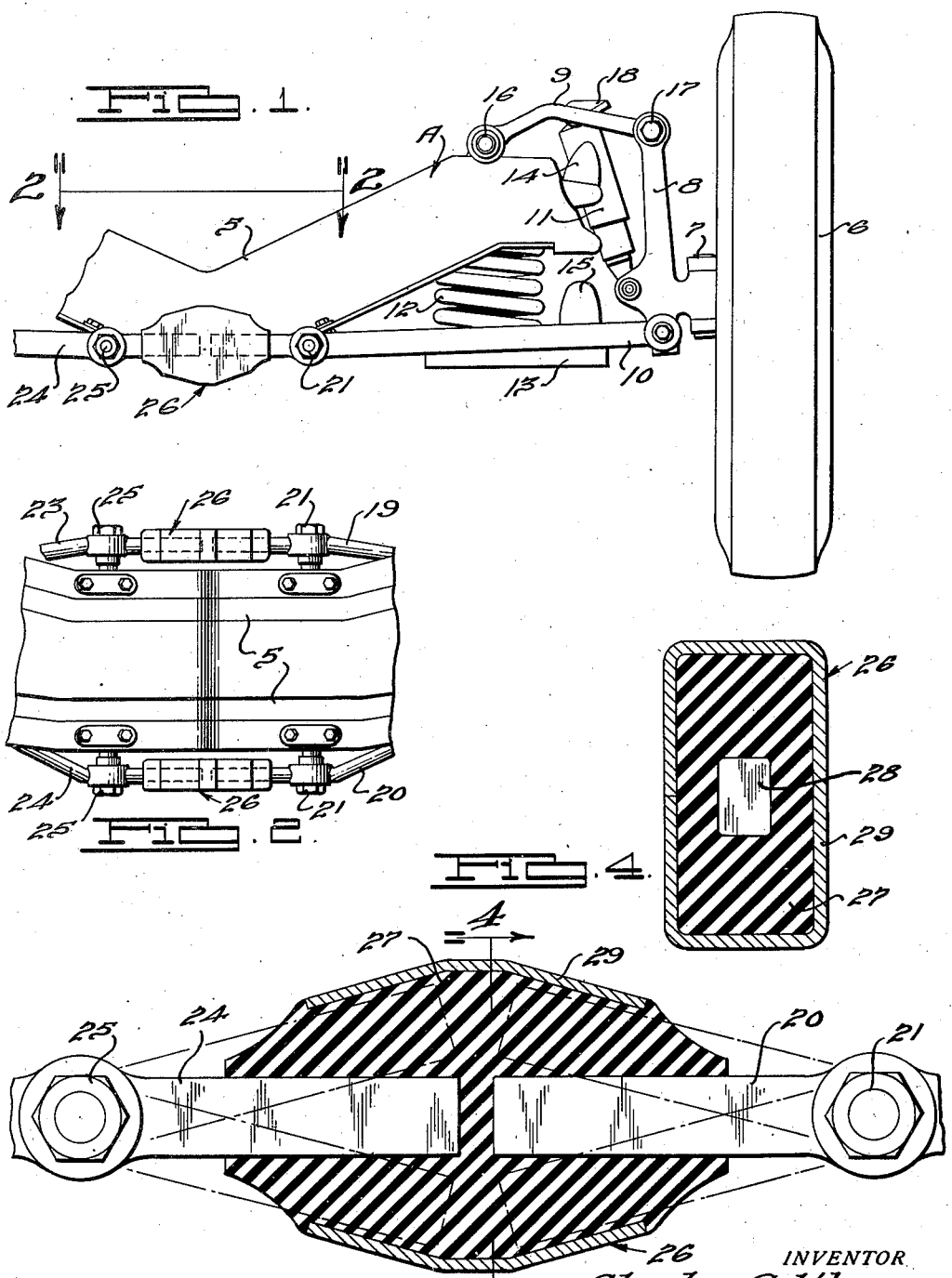

2,201,250

UNITED STATES PATENT OFFICE 2,201,250

MOTOR VEHICLE

Chester C. Utz, Detroit, Mich., assignor to Chrysler Corporation, Highland Park, Mich., a corporation of Delaware Application November 29, 1937, Serial No. 176,942

2 Claims. (Cl. 267—11)

This invention relates to a motor vehicle and refers more particularly to stabilizing means therefor.

An object of the invention is to provide improved means for controlling vehicle stabilization and to eliminate tilting thereof in response to the action of centrifugal force when the vehicle is rounding a curve; and to minimize the effects due to rising and falling movements of the vehicle road wheels resulting from road irregularities.

Another object of the invention is to provide means for yieldably resisting relative displacement of portions of the vehicle chassis whereby tilting or side sway of the vehicle body is minimized.

More particularly, the invention has for its object the provision of improved means for stabilizing a vehicle having an independent type of wheel suspension. In suspension systems of this type there are preferably employed a plurality of linkages supporting and guiding the road wheels for rising and falling movements, each of the linkages being pivotally connected to the frame and to the respective wheel support. In carrying out the objects of the invention the inner ends of linkages for the respective wheels are preferably so connected as to oppose the action of centrifugal force tending to tilt the vehicle when the latter is traveling in a curved path, and to yieldably oppose deflection of one road wheel relative to another. The connection for the linkages may comprise a yieldable material, such as rubber, or if desired, a shock absorber of the hydraulic type, for instance, may be used.

A still further object of the invention is to so construct and arrange the wheel support linkages that the latter serve to eliminate or minimize vehicle side sway and also as shock dampening means.

Other objects and advantages of the invention will be more apparent from the following description taken in connection with the accompanying drawing, in which:

Fig. 1 is an elevational view of a typical side portion of the front end of a vehicle embodying the invention.

Fig. 2 is a fragmentary top plan view taken as indicated by the line 2—2 of Fig. 1.

Fig. 3 is a longitudinal sectional view taken on the line 3—3 of Fig. 1.

Fig. 4 is a vertical sectional view taken on the line 4—4 of Fig. 3.

Referring to the drawing and particularly Fig. 1, there is shown a typical side portion of the front end of a vehicle, it being understood that a similar construction and arrangement of parts is employed for the opposite side portion. The construction includes a frame structure, generally indicated at A, having the transversely extending means 5 for connecting the conventional spaced longitudinally extending side rails (not shown). A road wheel 6 is supported by a suitable spindle (not shown) swivelly connected as at 7 to a knuckle bracket 8 for permitting steering movements of the wheel. Upper and lower linkages 9 and 10 are pivotally connected to the frame structure and to the upper and lower ends of the bracket 8 for supporting the wheel, these linkages guiding rising and falling movement of the latter. A suitable shock absorber 11 is interposed between the upper linkage 9 and the bracket 8 while a coil spring 12 supports the frame A upon the lower linkage 10, being seated upon a plate 13 carried by the latter. Yieldable abutments 14 and 15 are adapted to cushion relative movement between the wheel supporting means and the frame structure.

The upper linkage 9 is pivotally connected as at 16 to the frame structure and at 17 to the upper end of the bracket 8 and has a portion 18 adapted to engage the abutment 14. The lower linkage for each wheel support consists of a pair of arms 19 and 20 which are pivotally connected at 21 to the frame cross means 5, these arms converging adjacent their outer ends for pivotal attachment as at 22 to the bracket 8. Similar arms 23 and 24 constitute the lower linkage for the wheel at the opposite side of the vehicle front end and are pivotally connected as at 25 to the frame structure. The inner ends of the arms terminate at approximately the longitudinal vertical mid-plane of the vehicle and the adjacent ends of the arms 19 and 23 and those of arms 20 and 24 are suitably secured together as at 26, the connection for the inner ends of these arms being identical with an embodiment thereof shown in detail in Figs. 3 and 4.

In suspension systems of the foregoing type the linkages 9 and 10 and the bracket 8 constitute the relatively movable means for supporting the wheel spindle relative to the frame and guide rising and falling movement of the associated wheel relative to the frame independently of the other wheels. Heretofore it has been customary to employ stabilizing means consisting of a torsion bar for minimizing tilting and side sway of the vehicle. In the present instance, the connection between the arms of the lower linkages is designed to stabilize the vehicle without the necessity of the additional stabilizing means aforesaid.

The connection indicated at 26 consists of a body of yieldable material 27, preferably of rubber, having an opening 28 therein for receiving the ends of the arms 20 and 24 which project inwardly beyond their respective points of pivotal connection to the frame structure. The main body of the material is disposed above and below the arms inasmuch as movement of the latter is substantially vertical with respect to the connection. A housing 29 surrounds the material 27 and has its outer edges preferably spaced inwardly of the outer edges of the yieldable material in order to avoid interference with movement of the arms, although if desired the associated parts may be so arranged that the housing is co-extensive with the yieldable material.

In operation, when the connected arms 19 and 23 or 20 and 24 rise or fall together in response to corresponding movement of the wheels, the connection affords but slight resistance to movement of the arms inasmuch as it moves with the latter and there is a relatively slight deflecting force exerted on the yieldable material. However, when but one of the arms is moved, or the arms are displaced oppositely, due, for instance, to the action of centrifugal force as aforesaid, the connection becomes in a sense fixed with respect to its supporting frame structure and movement of the arm or arms is accommodated through displacement or deformation of the body of the rubber.

The extent of the opposition afforded by the yieldable connection to displacement of the arms may be varied by varying the hardness characteristics of the yieldable material, and also by varying the size of the body of the latter. Rubber is preferably employed in the connection for the reason that its hardness characteristics may be readily controlled to afford a predetermined opposition to displacement, although other suitable materials and compositions may be used if desired.

While there is a connection between the adjacent ends of the arms of both lower linkages, it will be understood that if desired the connection may be confined to one of the arms of each linkage. Furthermore, the invention may be utilized in connection with the rear or non-steering road wheels of the vehicle instead of the front or steering wheels as illustrated.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a motor vehicle including a supporting structure and a pair of oppositely disposed road wheels, means for supporting each of said wheels for independent rising and falling movement relative to said supporting structure, each of said supporting means including a rigid lever arm pivotally connected to said supporting structure, said arms having adjacently disposed end portions projecting laterally from the respective points of said pivotal connections, and an operating connection for said arms including a body of rubber-like material, each of said end portions being embedded in said rubber-like material and engaged thereby, said end portions being spaced longitudinally of said arms one from the other and the said rubber-like material extending into the space between said end portions.

2. In a vehicle including a supporting structure and a pair of oppositely disposed wheel carrying link members extending transversely of said supporting structure, means for pivotally mounting an intermediate portion of each of said link members on said supporting structure, the inner end portions of said links being spaced longitudinally thereof one from the other, an operating connection between said members including a body of rubber-like material enveloping said end portions and extending into the space between the latter, and a casing-like member for said material.

CHESTER C. UTZ.